Jan. 25, 1966
D. H. BLAUVELT ETAL
3,231,885
RESOLVER PHASE SHIFT ENCODER
Filed Feb. 28, 1962
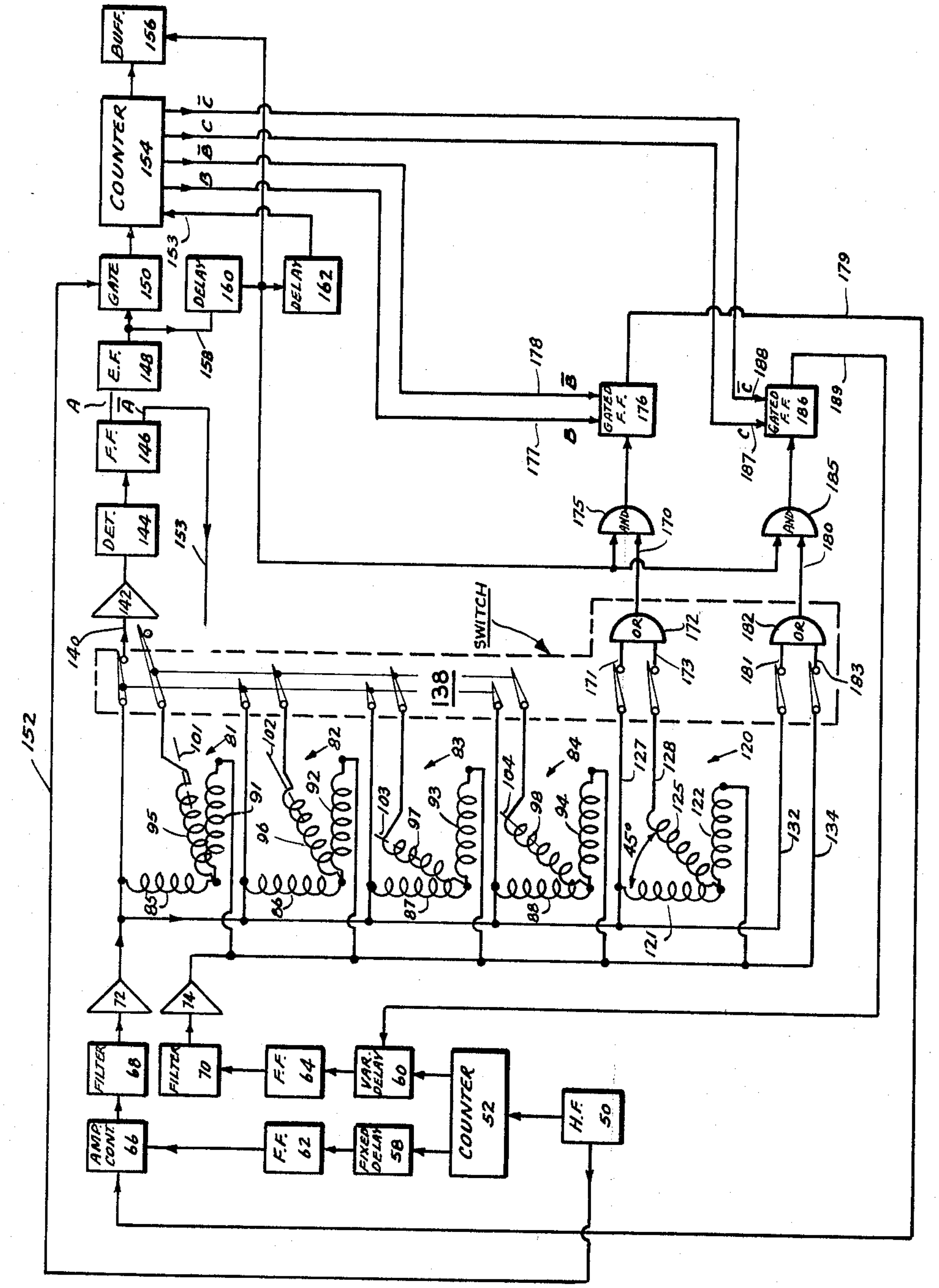
INVENTORS
DAVID H. BLAUVELT
MARVIN MASEL
BY [signature]
ATTORNEY United States Patent Office 3,231,885

Patented Jan. 25, 1966

3,231,885

RESOLVER PHASE SHIFT ENCODER

David H. Blauvelt, Ridgewood, and Marvin Masel, West Englewood, N.J., assignors to The Bendix Corporation, Teterboro, N.J., a corporation of Delaware Filed Feb. 28, 1962, Ser. No. 176,304
7 Claims. (Cl. 340—347)

The invention relates to analog-to-digital converters, and more particularly, to a resolver phase shift encoder.

An object of the invention is to provide a resolver phase shift encoder for converting an analog condition into a digital number.

Another object of the invention is to provide a novel multiplexed resolver phase shift encoder for converting analog conditions into digital numbers.

Another object of the invention is to provide a system for converting an analog condition into a binary digital number, using resolvers of the rotating field type and having novel means for generating, synchronizing, amplitude controlling, and quadrature controlling reference signals.

Another object of the invention is to provide a resolver phase shift encoder having novel means for accurately generating quadrature reference voltages of the same amplitude from a high frequency source used for counting and for frequency synchronizing the reference voltages with high frequency signal from the source.

Another object of the invention is to provide a novel method and means for generating alternating signals phase displaced 90° from each other.

Another object of the invention is to provide a novel method and means for generating from and frequency synchronizing with a high frequency signal quadrature signals.

Another object of the invention is to provide a novel method and means for maintaining two phase displaced signals at the same amplitude.

Another object of the invention is to provide a novel method and means for accurately maintaining a predetermined phase displacement between two signals.

Another object of the invention is to accurately control the relative amplitude and phase displacement of two sinusoidal signals.

The invention contemplates a resolver phase shift encoder comprising a counter; a high frequency signal source; a gate connecting the high frequency source to the counter so that the counter counts the number of cycles of high frequency signal during which the gate is open; a zero cross-over detector sequentially receiving a phase displaced signal and a reference signal for detecting zero level cross-over in a given direction and opening the gate in the interval between zero cross-over of the signals; generating means connected to the high frequency source and providing a pair of low frequency reference signals frequency related to the high frequency signals; a phase modulated resolver energized by the reference signals and connected to the zero cross-over detector and responsive to a condition for providing a phase modulated signal phase displaced in accordance with the condition to provide an output from the counter corresponding thereto; means for controlling the relative amplitudes of the reference signals including a phase modulated resolver having a fixed rotor and connected to the generating means and to the zero cross-over detector for energizing the counter in accordance with the relative amplitudes of the reference signals; and means controlled by the counter for changing the relative amplitudes of the signals; and means for controlling relative phase shift of the reference signals including means for connecting the generating means to the zero cross-over detector for applying the reference signals to the zero cross-over detector and controlling the output of the counter in accordance with the phase shift of the signals and phase shifting means controlled by the counter for changing the phase displacement of the signals.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

In the single figure of the drawing, there is shown a schematic drawing of the novel multiplexed resolver phase shift encoder constructed according to the invention.

The novel multiplexed resolver phase shift encoder comprises a high frequency signal source 50 which, for example, has a frequency of $100 \times 2^{14}$ cycles per second. The signal from source 50 is fed to an 11 stage binary counter 52 which may, for example, be of a type that uses 11 flip-flops. The eleventh stage (not shown) produces two square waves 180° out of phase with respect to each other and having a frequency of 800 cycles per second.

The two 800 cycles per second square waves are applied respectively to a fixed delay 58 and a variable delay 60, and then to two flip-flops 62 and 64. Flip-flops 62 and 64 divide the 800 cycles per second signals by two, to each provide two outputs of 400 cycles per second square waves. In the present embodiment, only one output from each flip-flop 62 and 64 is used. It is to be noted that the outputs of flip-flop 62 are 90° phase shifted from the outputs of flip-flop 64.

Output from flip-flop 62 is applied to an amplitude control 66 and then to a 400-cycle filter 68. The output of flip-flop 64 is applied directly to another 400-cycle filter 70 which may be identical to filter 68. Each filter, 68 and 70, converts the square waves to sine waves by passing a 400-cycle sinusoidal component of the square waves and blocking components of high frequency.

The signals from the filters 68 and 70 are applied respectivtly to amplifiers 72 and 74 for amplification.

The outputs of amplifiers 72 and 74 are sinusoids of equal amplitude, and in quadrature (i.e., equal frequency and phase shifted 90° with respect to each other). These outputs provide reference voltages to a plurality of phase modulator resolvers 81 through 84 having respectively stator windings 85 through 88 perpendicular to stator windings 91 through 94, and rotor windings 95 through 98. In particular, one reference voltage, for example, from amplifier 72 is applied to stator windings 85 through 88; and the other reference voltage from amplifier 74 is applied to stator windings 91 through 94, producing a rotating field in each resolver. These fields induce a signal in rotor windings 95 through 98. Each rotor 95 through 98 is displaced respectively by means of shafts 101 through 104 in accordance with an analog condition and provides phase modulated or phase displaced signals on each rotor winding 95 through 98 phase shifted from the reference voltages, the amount of phase shift or phase displacement being proportional to the amount of rotor displacement from a fixed reference position. This method of phase modulation, sometimes called the rotating field method, is well known and is further described in Radiation Laboratory Series, volume 19, Waveforms, ed. Chance et al., New York, McGraw-Hill, 1949, p. 497ff.

Conductors connect one stator winding of each resolver, for example, 85 through 88, and each rotor winding 95 through 98 to a multiplexing switch 138.

Resolver 120 has a stator winding 121 connected to the output of amplifier 72, and another stator winding 122 connected to the output of amplifier 74, and a rotor winding 125 fixed at a 45° position. Two conductors 127 and 128 connect respectively first stator winding 121 and rotor winding 125 to switch 138. Resolver 120 is used for amplitude control of the reference voltage as described hereinafter.

Two conductors 132 and 134 connect amplifiers 72 and 74, respectively, to switch 138 for quadrature control of the reference voltages, described hereinafter.

Switch 138 may be of any conventional type provided each conductor into the switch is sequentially connected (in response to an activating signal) to an output conductor 140. Switch 138 may be an electrical or mechanical switch, and, for example, is described hereinafter as a mechanical switch.

A signal on conductor 140 is amplified by an amplifier 142 and then applied to a signal level detector 144 which, for example, is a zero cross-over detector of the type that produces a pulse coincident with a signal passing through zero level in the positive direction. Pulse from detector 144 triggers a flip-flop 146 having two outputs: each with an activating signal designated A, and the other, its component, $\overline{A}$. The A output signal is applied to an emitter follower 148 and then to a gate 150. For purposes of description, assume that a low signal applied to gate 150 opens it, while a high signal closes it. Gate 150 controls passage of high frequency signals from source 50 via a conductor 152, to a counter 154.

The complementary output $\overline{A}$ of flip-flop 146 is applied via conductor 153 to switch 138 activating it, so conductor 140 is connected with the next conductor into switch 138.

When a reference signal from one stator winding such as 85 is applied to detector 144, the zero crossing of the reference signal is detected to produce a pulse, which triggers flip-flop 146, which in turn provides a low signal on output A, which opens gate 150. Simultaneously, output $\overline{A}$ from flip-flop 146 activates switch 138, and conductor 140 is connected to the next conductor, that is, with rotor winding 95. The zero crossing of the phase modulated signal on rotor 95 is now detected by detector 144 producing a pulse which trips flip-flop 146, giving a high signal on output A, and in turn, closing gate 150. The phase difference between the reference signal on the stator winding and the phase displaced signal on the rotor winding is measured by counting the number of cycles of high frequency signal enabled into counter 154. Knowing the frequency of source 50, $100\times2^{14}$, and the frequency of the reference signal on stator winding 85, $100\times2^{2}$, the size of the binary number appearing in counter 154 is proportional to the displacement of rotor winding 95, corresponding to the analog condition applied on shaft 101. This type of analog-to-digital conversion is discussed in standard books on the topic, reference being made to Notes on Analog to Digital Conversion, ed. by Alfred K. Susskind, Cambridge, The Technology Press, 1957, c.f. ch. VI, sec. 6.

A buffer 156 is used to read the contents of counter 154 and transfer these contents to a memory (not shown) or other functional part of a computer (not shown) to which the circuit of FIGURE 1 may be connected. The reading of counter 154 is synchronized with the closing of gate 150. Assume a positive going signal from emitter follower 148 closes gate 150. This signal is applied via a conductor 158 and a time delay 160 to actuate buffer 156. Time delay 160 is necessary because a short time is required for counter 154 to finish counting after gate 150 has closed.

Counter 154 is reset after each counting, and after buffer 156 has read its contents. It will be recalled that a positive going signal from emitter follower 148 closes gate 150 blocking additional signals into the counter. The signal from emitter follower 148 is used to reset counter 154; however, as a short time is required for counter 154 to complete its count, and also an additional short time is required for buffer 156 to read the contents of counter 154, two time delays 160 and 162 are included between the output of emitter follower 148 and reset terminal 153 of counter 154. A positive signal applied at reset 153 resets counter 154.

Counter 154 is, for example, a 12 stage flip-flop binary counter. The tenth stage records a 45° phase shift, and the eleventh stage records a 90° phase shift. The tenth stage has two outputs, B, and its complement $\overline{B}$; and the eleventh stage has two outputs, C, and its complement $\overline{C}$. For purposes of example, consider a high signal on B or C as a reading. Thus, for phase angle measurements in the vicinity of 45°: the output of the tenth stage will be high on B and low on $\overline{B}$ if the phase angle being measured is 45° or greater than 45°; and the output will be low on B and high on $\overline{B}$ if the phase angle being measured is less than 45°. Likewise, for readings in the vicinity of 90°, the output on C will be high, and low on $\overline{C}$ if the reading is 90° or above, and the output will be low on C and high on $\overline{C}$ if the reading is less than 90°. In addition to providing a digital readout of the analog signal, these two stages are used respectively for amplitude and phase control of the reference voltages from amplifiers 72 and 74.

AMPLITUDE CONTROL

The reference voltages from amplifiers 72 and 74 are made equal in amplitude by use of a control circuit that includes a resolver 120, having its rotor winding 125 fixed at a 45° position. It will be appreciated that, if the amplitudes of the reference voltages are not exactly equal, the phase modulated signal on rotor winding 125 will not be phase displaced exactly 45° from the reference voltage on stator winding 121. In particular, with stator 121 as reference, and the 45° displacement of rotor winding 125 measured from stator 121, as indicated in the drawing, a voltage applied on stator 121 from amplifier 72 larger than the voltage applied on stator 122 from amplifier 74 phase displaces the voltage on rotor 125 more than 45°. Likewise, for a reference voltage from amplifier 72 less than the reference voltage from amplifier 74, the voltage on rotor winding 125 is phase displaced less than 45°.

Stator winding 121 and rotor winding 125 are connected to switch 138 via conductors 127 and 128 respectively. Switch 138 is so constructed that when making contact with either stator winding 121 or rotor winding 125 a signal is also applied on an output conductor 170. This may be achieved by having switch 138 include a double pole single throw contactor (not shown), with conductor 140 connected to the center of the contactor. Thus, when one pole of the contactor is connected to conductor 127, the other pole is connected to a conductor 171, which, in turn, connects to a delaying OR gate 172. Similarly, with the contactor in the next position, one pole contacts conductor 128 while the other pole contacts conductor 173. Thus, delaying OR gate 172 provides an output on conductor 170 when the switch 138 is in contact with either stator winding 121 or rotor winding 125 of resolver 120 and for a short time thereafter.

The signal on conductor 170 is applied as one input to an AND gate 175, the other input coming from time delay 160. A signal from AND gate 175 is applied to a gated flip-flop 176 and will cause flip-flop 176 to read any signals being applied at its input (set and reset) terminals 177 and 178. Flip-flop 176 is connected to receive respectively on input terminals 177 and 178 the B and $\overline{B}$ output of the tenth stage of counter 154. The output of flip-flop 176 is fed through conductor 179 to an amplitude control 66 which increases or decreases the amplitude of the reference voltage available at amplifier 72.

*Operation*

Switch 138 makes contact with the stator winding 121 and then with rotor winding 125. In turn, counter 154 records the phase angle difference between the voltages on these two windings. If the phase angle difference is 45° or greater, there is a high on B and a low on $\overline{B}$ of the tenth stage of counter 154, and if the phase displacement is less than 45°, there is a low on B a high on $\overline{B}$.

Simultaneously, with switch 138 making contact with either stator 121 or rotor winding 125, a signal is applied from switch 138 via conductor 170 and to AND gate 175.

When counter 154 has completed counting the phase angle difference, a positive going signal from delay 160 is applied to AND gate 175. This signal triggers AND gate 175 and causes the gated flip-flop 176 to read the contents of the tenth stage of the counter 154.

Flip-flop 176 now produces a high or low output on conductor 179 according to the contents of the tenth stage of counter 154. For example, if B is high and $\overline{B}$ is low (i.e. reading 45° or greater) then there is a high output of flip-flop 176.

The output of flip-flop 176 is applied via conductor 179 to amplitude control 66. In the example, a high signal applied to control 66 decreases the amplitude of the reference voltage from amplifier 72.

When switch 138 samples the output of resolver 120 in the next cycle of switch 138, output of the tenth stage of counter 154 is again applied to flip-flop 176.

If the amplitude of the signal from amplifier 72 is again less than the amplitude of the signal from amplifier 74, the phase angle or phase shift on resolver 120 is greater than 45°, producing a high on output B and a low on output $\overline{B}$ at the tenth stage of counter 154, which, applied to flip-flop 176 produces a high on conductor 179, and this, in turn, is applied to amplitude control 66 to further decrease the amplitude of reference voltage amplifier 72.

If, however, the amplitude of signals from amplifier 72 exceeds the amplitude of signal from amplifier 74, the phase angle read on resolver 120 is less than 45° and there is a zero on the tenth stage of counter 154, i.e. B is low and $\overline{B}$ is high. When applied to flip-flop 176, this produces a low on output conductor 179; this low applied to amplitude control 66 increases the amplitude of the reference voltage from amplifier 72.

Thus, the amplitude of the reference voltage is adjusted during each operating cycle of switch 138.

QUADRATURE CONTROL

Quadrature control of the reference voltages is achieved with a circuit very similar to the circuit used for amplitude control. The phase difference between the two reference voltages is measured on counter 154. If the voltages are less than 90° out of phase, the eleventh stage of counter 154 reads low (C low, $\overline{C}$ high); and if the voltages are 90°, or more than 90°, out of phase, the eleventh stage of counter 154 reads high (C high, $\overline{C}$ low). The output of the eleventh stage is fed to a gated flip-flop 186 which reads the eleventh stage. A high from the eleventh stage sets flip-flop 186 and a low resets it, producing a signal at the output of the flip-flop which activates a variable delay 60 to phase shift the reference voltages as appropriate. The operation of the quadrature control will now be examined in detail.

Switch 138 makes contact sequentially with conductor 132 and then with conductor 134, which respectively receive the reference voltages from amplifiers 72 and 74. When switch 138 is in either of these two positions, an output is provided on a conductor 180. (This may be accomplished by using a delayed OR gate 182 having two input conductors 181 and 183 for making contact with the contactor of switch 138.) Conductor 180 is connected as one input to an AND gate 185, the second input coming from delay 160.

The phase displacement between the reference voltages on conductor 132 and 134 is measured and counted in counter 154. The eleventh stage of counter 154 is connected to gate flip-flop 186. Once the count has been completed, a positive going signal from delay 160 is applied to AND gate 185, which, in turn, opens gated flip-flop 186 to receive outputs C and $\overline{C}$ from the eleventh stage of counter 154 at set and reset terminals 187 and 188 respectively of flip-flop 186. Flip-flop 186 provides a high or low signal on conductor 189 according to the condition of the eleventh stage of counter 154. Conductor 189 is connected to variable delay 60 and the signal from flip-flop 186 activates variable delay 60 to advance or retard the phase of the 800-cycle square wave from binary counter 52 that provides the reference signal available to amplifier 74.

As an example, assume that the reference signals are slightly more than 90° out of phase. This will produce a high on C and a low on $\overline{C}$, which, in turn, produces a high at the output of flip-flop 186, through conductor 189 to variable delay 60. A high signal, applied to variable delay 60 delays the phase of the 800 cycles per second from delay 60 decreasing the phase angle displacement between the two reference voltages. In the example, the reference signal from amplifier 74 leads the reference signal from amplifier 72.

When switch 138, in the next sequence, samples the voltages on terminals 132 and 134, a phase angle difference of 90° or more will further delay the signal on amplifier 74. Likewise, a phase angle difference of less than 90° will advance the phase of the signal on amplifier 74.

It should be noted that the phase control is completely independent of amplitude of the quadrature signals and the amplitude control circuit so long as detector 144 detects zero cross-over.

The novel multiplexed resolver phase shift encoder described herein converts analog signals into binary digital numbers. Each of the analog signals is applied as a phase modulating signal to one of a plurality of phase modulating resolvers, which operates on the rotating field principle. For accurate phase modulation, each resolver requires two reference voltages of equal amplitude, and in quadrature. The novel amplitude control and novel quadrature control maintain accurate reference voltages. The outputs of the phase modulators are multiplexed and applied to a single zero cross-over detector, thus avoiding the use of multiple zero cross-over detectors and the problems associated with them. Successive zero cross-overs of a reference voltage and a phase modulated voltage are detected to start and stop a counter which measures in digital form the amount of phase modulation which is proportional to the analog signal. The frequency of the reference voltages is related to the frequency of a high frequency signal source which advances the counter so that any variations in the frequency of the source or of the reference voltages do not introduce inaccuracies into the system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A resolver phase shift encoder comprising a counter, a high frequency signal source, a gate connecting the high frequency source to the counter so that the counter counts the number of cycles of high frequency signal during which the gate is open, a zero cross-over detector sequentially receiving a reference signal and a phase displaced signal for detecting zero level cross-over in a given direction and opening the gate in the interval between zero cross-over of the signals, generating means connected to the high frequency source and providing a pair of low frequency reference signals frequency related to the high frequency signals, a phase modulated resolver energized by the reference signals and connected to the zero cross-over detector and responsive to a condition for providing a phase modulated signal phase displaced from the reference signals in accordance with the condition to provide an output from the counter corresponding thereto, and means for controlling the relative amplitudes of the reference signals including a phase modulated resolver having a fixed rotor and connected to the generating means and to the zero cross-over detector for energizing the counter in accordance with the relative amplitudes of the reference signals, and means controlled by the counter for changing the relative amplitudes of the signals, and means for controlling relative phase shift of the reference signals including means for connecting the generating means to the zero cross-over detector for applying the reference signals to the zero cross-over detector and controlling the output of the counter in accordance with the phase shift of the signals, and phase shifting means controlled by the counter for changing the phase displacement of the signals.

2. A multiplexed resolver phase shift encoder comprising (1) a source of high frequency signal, (2) generating means connected to the source and providing two phase displaced low frequency reference signals frequency related to the high frequency signal, (3) a plurality of phase modulator resolvers of the rotating field type connected to the generating means and energized by the reference signals and responsive to a condition and providing phase modulated signals phase displaced from the reference signals in accordance with the condition, (4) an amplitude reference resolver of the rotating field type having a fixed rotor and connected to the generating means and energized by the reference signals and providing an amplitude reference signal phase displaced in proportion to the relative amplitudes of the reference signals, (5) zero cross-over detecting means for providing an activating signal coincident with zero level cross-over in a given direction, (6) a multiplexing switch for sequentially connecting the resolvers and generating means to the zero cross-over detecting means and arranged to interpose a reference signal between the phase modulated signals and provide a pair of phase displaced reference signals after each sequence to the detecting means, (7) digital counting means connected to the detecting means to receive the activating signals and connected to the high frequency source to count the number of cycles of high frequency signal during an interval between a phase modulated signal and a reference signal and between the pair of phase displaced reference signals, the number of cycles counted being a digital number proportional to the phase displacement of the signals, (8) the generating means including amplitude control means controlled by the counting means to change the relative amplitudes of the reference signals in accordance with the phase displacement of the amplitude reference signal measured by the counting means, and (9) the generating means including phase control means controlled by the counting means for relatively phase shifting the reference signals in accordance with the phase displacement of the pair of reference signals measured by the counting means.

3. In the multiplex resolver phase shift encoder of the kind described in claim 2, the digital counting means including a multi-stage binary counter.

4. A circuit for maintaining two quadrature voltages at the same amplitude comprising:

(1) a resolver having two stator windings displaced 90° with respect to each other and each receiving a quadrature voltage, and a rotor winding displaced midway between the two stator windings, (2) switching means having one input connected to one stator winding, a second input connected to the rotor widing, and an output sequentially connected to the inputs, (3) zero cross-over detecting means connected to the output of the switching means and providing a signal whenever a voltage at the output of the switching means passes through zero level in a given direction, (4) means for sequencing the switching means when the zero cross-over detecting means provides a signal, (5) means for counting the time between two signals corresponding to phase angle difference between voltages on the rotor and stator widings to indicate differences in phase angle greater or less than 45°, and (6) amplifying means receiving a quadrature voltage and controlled by said counting means to change the amplitude of the voltage when the phase angle is other than 45°.

5. A circuit for maintaining two voltages phase displaced a predetermined amount with respect to each other at the same amplitude, comprising (1) a resolver having two stator windings displaced the predetermined amount, a rotor winding displaced midway between the two stator windings, the first stator winding being energized by one of said voltages, and the second stator winding being energized by the other of said voltages, (2) switching means having a first input connected to the first stator winding, a second input connected to the rotor winding, and an output, (3) zero cross-over detecting means connecting to the output of the switching means to provide a signal whenever a voltage on the output of the switching means passes through zero level in a given direction, (4) means connected between the zero cross-over detector and the switching means for applying an activating signal to the switching means when the zero cross-over detecting means produces a signal for sequentially connecting the switching means inputs to the output, (5) a counter connected to the detecting means and receiving the signals therefrom for counting an interval between two signals, which interval corresponds to phase displacement between the voltages on the first stator and the rotor windings, the counter having an output indicating the amount of displacement, (6) amplifying means receiving one of the voltages and connected to the counter output to change the relative amplitude of the one reference voltage relative to the other reference voltage when the counter output indicates a phase angle greater than half the predetermined amount, and to provide a decrease in relative amplitude of the one voltage relative to the other voltage when the counter output indicates a phase angle less than half the predetermined amount.

6. A circuit for maintaining a predetermined phase difference between two signals, comprising (1) a switch having an output and receiving the signals and sequentially applying the signals to the output in response to an activating signal, (2) detecting means having an input connected to the output of the switching means and adapted to provide an activating signal coincident with the zero cross-over of a signal applied at its input, (3) activating means connected between the detecting means and the switch for activating the switch in accordance with a signal from the detecting means, (4) counting means connected to the detecting means for counting the interval between two activating signals from the detecting means to determine the phase angle difference between the two signals, and (5) phase control means controlled by the counting means and receiving at least one of the signals for phase shifting the signal in accordance with the interval.

7. A circuit for maintaining a predetermined phase difference between two signals of the kind described in claim 5 in which the counting means has a multiple stage binary counter, one stage of which corresponds to the predetermined phase difference.

References Cited by the Examiner

UNITED STATES PATENTS

| | | | |
|---|---|---|---|
| Re. 24,053 | 8/1955 | Morris | 328—27 |
| 2,850,240 | 9/1958 | Dickinson | 340—347 |
| 2,947,929 | 8/1960 | Bower | 340—347 |
| 3,045,230 | 7/1962 | Tripp et al. | 340—347 |

MALCOLM A. MORRISON, *Primary Examiner.*